Sept. 7, 1965  W. R. TAYLOR  3,204,536
RENEWABLE PISTON
Filed Nov. 18, 1963  2 Sheets-Sheet 1
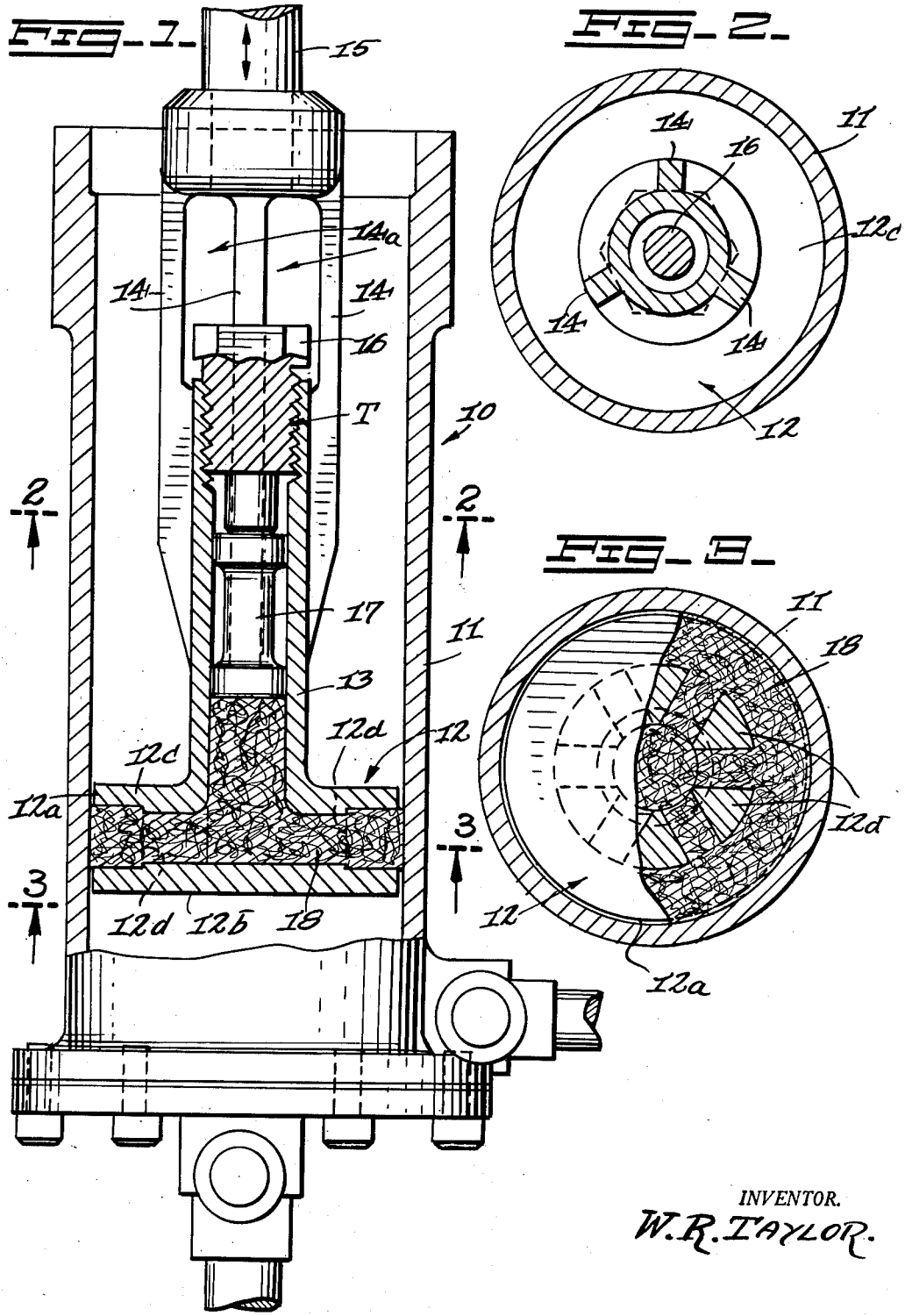
INVENTOR.
W.R. TAYLOR.

Sept. 7, 1965 W. R. TAYLOR 3,204,536
RENEWABLE PISTON
Filed Nov. 18, 1963 2 Sheets-Sheet 2

INVENTOR.
W. R. TAYLOR.

United States Patent Office 3,204,536
Patented Sept. 7, 1965

3,204,536
RENEWABLE PISTON
William Raymond Taylor, 1516 E. 10th St., Odessa, Tex.
Filed Nov. 18, 1963, Ser. No. 324,332
4 Claims. (Cl. 92—155)

The present invention relates to packing for reciprocating pistons, and more particularly to renewable piston packing in which the packing may be renewed without removing the piston from its cylinder.

In pistons equipped with conventional type packing, when the latter wears out, it is necessary to stop the engine for considerable time to replace the worn out packing. The present invention is an improvement thereon allowing the replacement of worn out packing by merely tightening a packing screw or nut. This process does away with throwing away worn piston cups, and inasmuch as the packing is not made of rubber rings but may be formed of mica, lead, graphite and wood saturated in oil, the packing never wears out the cylinder lining, like rubber, which is very abrasive; while the lead, graphite and wood type packing is easy on the liner.

Furthermore, many pumping operations require pressure to be built up which takes considerable time. In the event it is necessary to repack the lining in the piston, this pressure time is wasted. With the present invention which requires only the turn of a screw to renew the packing in a piston, this pressure time waste is eliminated. Likewise, in the event the piston liner has a groove in it, a piston provided with ordinary packing will not operate since the ordinary packing cannot conform to the groove in the cylinder, whereas the present renewable piston packing can.

An object of this invention is to provide a piston packing means of the class described which is inexpensive, easy to use, time saving and may not damage the liner in a cylinder.

An additional object of this invention is to provide a packing screw means by which piston packing may be tightened or renewed by simply tightening the packing screw.

A further object of this invention is to provide a packing nipple to facilitate renewing and replacement of the packing compound, in the piston.

This invention also consists in certain other features of construction, and the combination and arrangement of parts, to be hereinafter fully described, illustrated in the accompanying drawings, and specifically pointed out in the appended claims.

In describing the invention in detail, references will be made to the accompanying drawings, where like character numerals denote like or corresponding parts throughout the several views, in which:

FIG. 1 is a section through the embodiment of the present invention;

FIG. 2 is a section on the line 2–2 of FIG. 1;

FIG. 3 is a section on the line 3–3 of FIG. 1;

Figure 4:
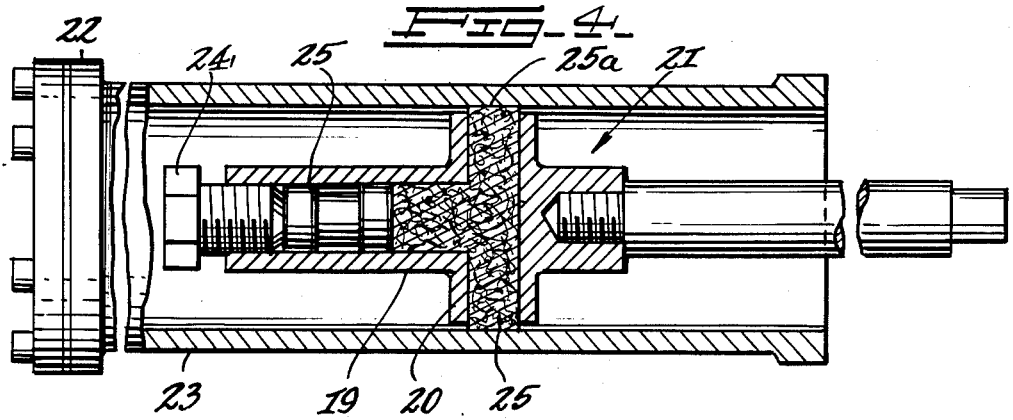
FIG. 4 is a modification showing the packing gland mounted in the forward end of the cylinder.

It is to be understood that the present form of disclosure is merely for the purpose of illustration and that there might be various modifications thereof, without departing from the spirit of the invention as herein set forth.

Referring now more particularly to the piston packing 10, best shown in FIG. 1, made in accordance with the present invention, it comprises, in combination, the cylinder liner 11, the piston 12, the vertical (or horizontal) piston arm 13, the piston mounting member 14, the piston rod 15, the piston packing screw or the packing gland nut 16 which is accessible without removal of the piston, the packing gland 17, and the expandable extrudable packing 18.

A conduit is formed within the piston arm 13 which is accessible to outside the cylinder without removal of the piston 12.

Reference being made to FIGS. 1 and 2, inclusive, it can be seen that the expandable packing 18 may be housed inside the hollow barrel-shaped piston 12, and may be formed in such a manner as to slightly extend (5 thousandths of an inch, approximately) beyond the outer diameter 12a of the piston 12, substantially as shown. The piston's face 12b may be secured and made an integral part of the piston base 12c by means of the transverse members 12d (six in number, in this case), which bridge the piston face 12b and the piston base 12c, to connect them to one another. The face 12b and the base 12c have an annular shoulder which with the outer portion of the transverse members 12d prevent the packing 18 from retracting once it has been extruded. Therefore, it may be seen that the packing screw 16 and packing gland 17 may be removed and additional packing 18 added even while there is pressure on the system inasmuch as the shoulder and outside portions of the transverse members 12b hold the packing in position without the pressure exerted by the packing screw 16.

Figure 5:
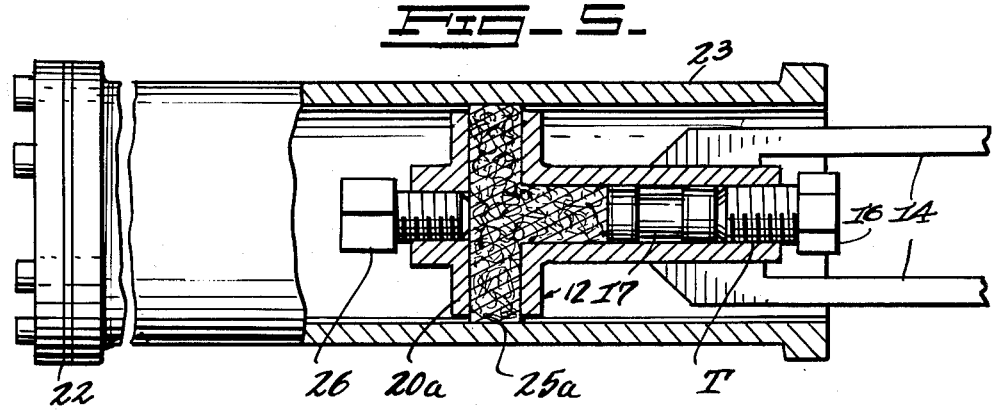
FIG. 5 is an additional modification showing a plug for the purpose of retaining the packing in the cylinder.
Figure 6:
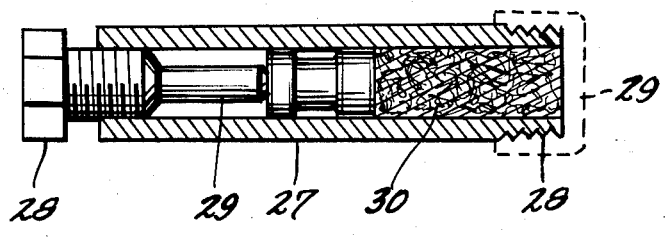
FIG. 6 is an enlarged view of a packing gland.

Referring to the modifications shown in FIGS. 4 to 6, inclusive, whereas in FIGS. 1 to 3 it was illustrated the manner in which the renewable packing is applied to the piston from the open end of a conventional cylinder, FIG. 4 shows the application of a packing 19 mounted in the section 20 of the piston 21, facing the closed end 22 of the cylinder 23. The packing 19 may consist of the packing gland screw 24, the packing gland 25 and the expandable extrudable packing 25a. Although it is necessary to remove the head at closed end 22 from the cylinder to remove the packing, it is not necessary to remove the piston 21 from the cylinder when renewing the packing.

FIG. 5 shows the manner in which an auxiliary packing gland screw 26 may be mounted in the end 20a of the piston 21, allowing renewal of the packing 25a, either from the front or the rear end of a conventional piston. FIG. 5 shows a packing plug 27 used for quick replacement purposes. The plug 27 may be provided with a threaded end 28 which normally is closed by means of a threaded cup 29 (shown in dotted lines). When mounting the plug 27 to the piston, the cup 29 is removed and the plug is threaded into the threaded end T in the mounting member 14 (see FIG. 1). The plug 27 may be provided with its own packing gland screw 28, the packing gland 29 and the piston packing compound 30.

A careful examination of the foregoing description in conjunction with the invention as illustrated in the drawings, will enable the reader to obtain a clear understanding and impression of the alleged features of merit and novelty, sufficient to clarify the construction of the invention as hereinafter claimed.

Minor changes in shape, size and materials, and rearrangement of parts, may be resorted to in actual practice, as long as no departure is made from the invention claimed.

Having described my invention, what I claim is the following:

1. In a piston-cylinder combination having
 (a) a cylinder,
 (b) a hollow piston mounted to reciprocation inside the cylinder, and
 (c) the outside diameter of the piston being slightly smaller than the inside diameter of said cylinder;
the improvement comprising:
(d) an extrudable packing in said hollow piston,
(e) a packing screw threaded into the piston for extruding the packing into the annular space between the piston and cylinder,
(f) said packing screw being mounted in a piston arm which is attached to the piston, and
(g) to which a piston rod is attached,
(h) said screw accessible to the outside of the cylinder while the piston is in place.

2. In a piston-cylinder combination having
(a) a cylinder,
(b) a hollow piston mounted to reciprocate inside the cylinder, and
(c) the outside diameter of the piston being slightly smaller than the inside diameter of said cylinder;
the improvement comprising:
(d) an extrudable packing in said hollow piston,
(e) a packing screw threaded into the piston for extruding the packing into the annular space between the piston and cylinder,
(f) said screw accessible to the outside of the cylinder while the piston is in place,
(g) said packing screw fitting within a conduit which the packing is contained, and
(h) said conduit being accessible to the outside of the cylinder while the piston is in place.

3. The invention as defined in claim 2 wherein
(j) the packing screw is mounted in a piston arm which is attached to the piston, and
(k) to which a piston rod is attached.

4. In a piston-cylinder combination having
(a) a cylinder,
(b) a hollow piston mounted to reciprocate inside the cylinder, and
(c) the outside diameter of the piston being slightly smaller than the inside diameter of said cylinder;
the improvement comprising:
(d) an extrudable packing in said hollow piston,
(e) a packing screw threaded into the piston for extruding the packing into the annular space between the piston and cylinder,
(f) said screw accessible to the outside of the cylinder while the piston is in place, and
(g) means in the hollow piston for maintaining the packing in an extruded position without the pressure from the packing screw so that the packing screw may be removed while the piston is in place and the packing is holding pressure.

References Cited by the Examiner
UNITED STATES PATENTS

| | | | |
|---|---|---|---|
| 105,465 | 7/70 | Knowles | 92—201 |
| 120,565 | 11/71 | Blake | 92—201 |
| 1,003,304 | 9/11 | Thompson | 92—207 |
| 1,014,744 | 1/12 | Bavier | 92—155 |

KARL J. ALBRECHT, *Primary Examiner.*

RICHARD B. WILKINSON, *Examiner.*